March 16, 1965 V. L. McHENRY ETAL 3,173,322
APPARATUS FOR CUTTING RESILIENT BLANKET-LIKE MATERIAL
Filed Dec. 7, 1962 2 Sheets-Sheet 1

INVENTORS
VICTOR L. McHENRY
BONARD Y. MACE
BY
ATTORNEY.

March 16, 1965  V. L. McHENRY ETAL  3,173,322
APPARATUS FOR CUTTING RESILIENT BLANKET-LIKE MATERIAL
Filed Dec. 7, 1962  2 Sheets-Sheet 2
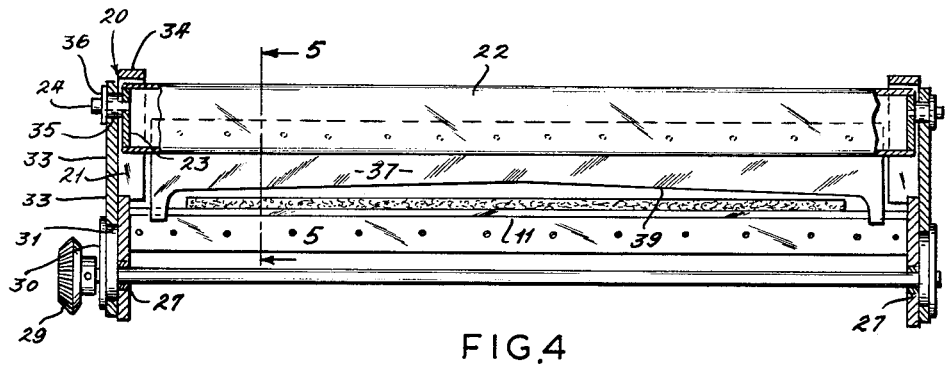
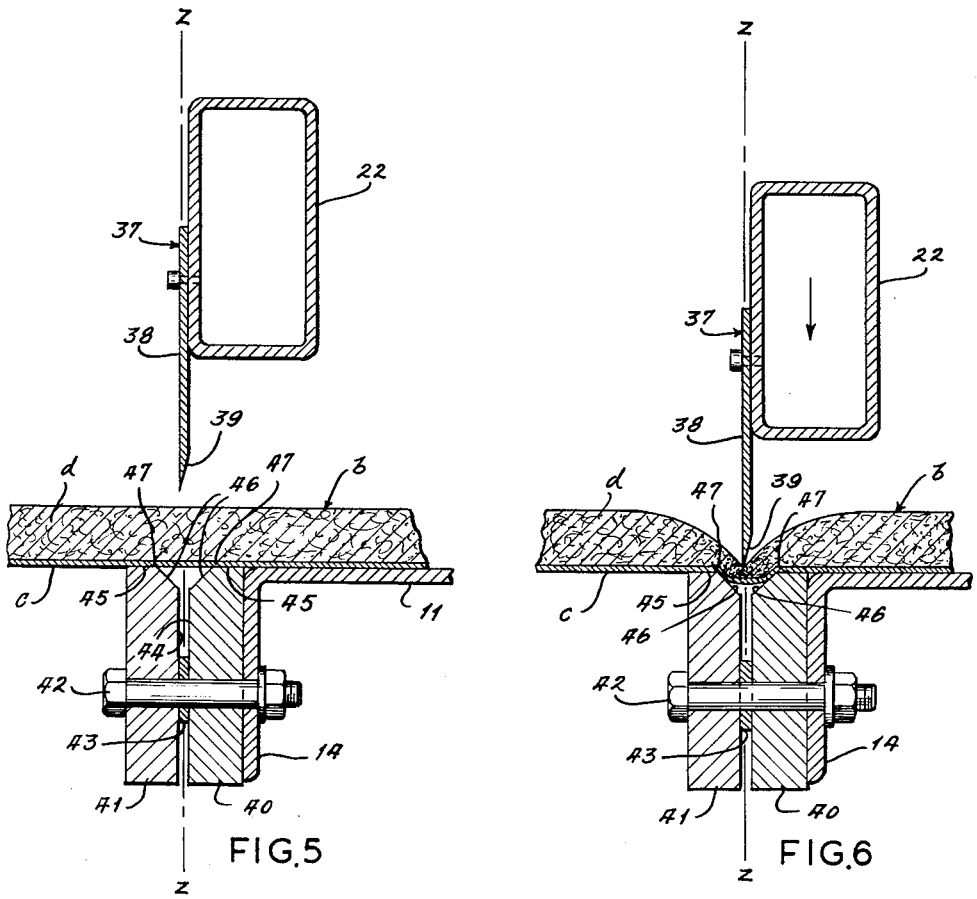
INVENTORS
VICTOR L. McHENRY
BONARD V. MACE
BY
ATTORNEY 3,173,322
APPARATUS FOR CUTTING RESILIENT
BLANKET-LIKE MATERIAL
Victor L. McHenry, Overland, Mo., and Bonard V. Mace,
East St. Louis, Ill., assignors to Engel Equipment, Inc.,
St. Louis, Mo., a corporation of Missouri
Filed Dec. 7, 1962, Ser. No. 243,152
4 Claims. (Cl. 83—175)

This invention relates to method and apparatus for cutting resilient blanket-like material such as fibrous glass insulating blankets.

While the bulk of such blanket-like material may be fluffy fibers which are readily separated from each other, so as to have little strength in tension, the material is normally furnished with one surface having substantial tensile strength, which may be provided by treating the fibers of that surface and compressing them adheringly together, or by a separate backing sheet material. Such stronger surface is hereafter referred to as the "backed" surface, or one having a "backing, regardless how its increased tensile strength is. Such material is not readily sheared either by hand shears or by conventional shearing tools. The term "shear" is here used in the common technical sense of the word; that is, cutting by the action of opposed edges of metal.

An object of the present invention is to provide a method of cutting unlike shearing and more similar to the action of drawing a knife along material suspended taut. A further purpose is to provide apparatus by which such method of cutting may be carried out, without employing provision to clamp or hold down the material in place prior to cutting. A further purpose is to provide apparatus for cutting such fibrous material neatly, smoothly, and precisely perpendicular to the blanket surface. Other objects will be apparent from this specification.

In general the present invention achieves these objects by a new method of cutting, and a tool providing the same, in which material is positioned in a horizontal plane across an inward sloping notch; and in which the drawing of a knife edge downward in a progressive cutting stroke along the center of the notch depresses the backing of the material downward in a concave curve. The resiliency of the fibrous material confined within such a concave curve tends to force the backing against the sides of the notch, thereby holding it suspended taut within and across the notch below the plane, while the knife's cutting stroke severs the material progressively.

Apparatus embodying the present invention is illustrated in the accompanying drawings, in which:

FIGURE 4 is an enlarged sectional view taken along line 4—4 of FIGURE 1.

FIGURE 5 is a further enlarged fragmentary sectional view taken along line 5—5 of FIGURE 4, with the cutter blade raised.

FIGURE 6 is a view similar to FIGURE 5, with the blade shown partially lowered as it severs the insulating blanket.

Figure 1:
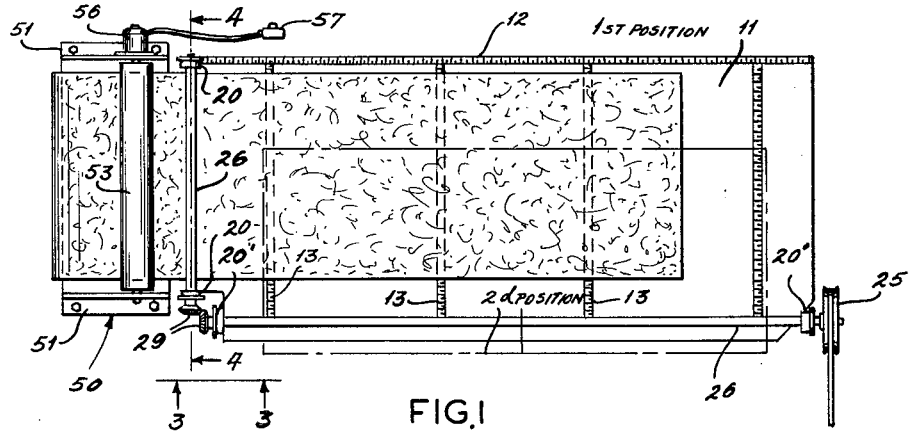
FIGURE 1 is a plan view of a cutting table embodying the present invention, with its aft edge facing toward the bottom of the drawing.

The cutting table illustrated includes a table surface 11 substantially rectangular in plan form, bounded along its forward edge (shown at the top of FIGURE 1) by an upstanding linear gauge 12 graduated in inches from the perpendicular cutting plane z—z of its end cutter hereafter described, and having several fore and aft scales 13 flush with the surface 11 and graduated from the perpendicular cutting plane of its longer side cutters shown at the bottom of FIGURE 1. The table surface 11 terminates near such cutting planes in flanged angle portions 14 shown in FIGURES 5 and 6; and at its opposite edges is reinforced by similar edge portions. Conventional truss-like table support members 15 and legs 16 are used to support the table surface 11 in a horizontal plane.

Figure 2:
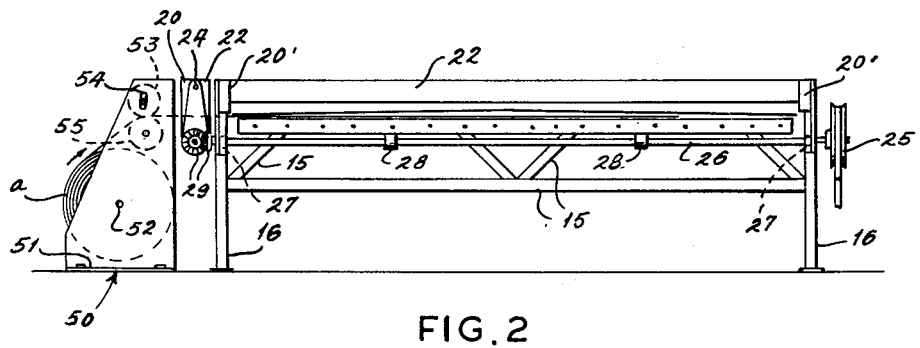
FIGURE 2 is an elevation thereof.
Figure 3:
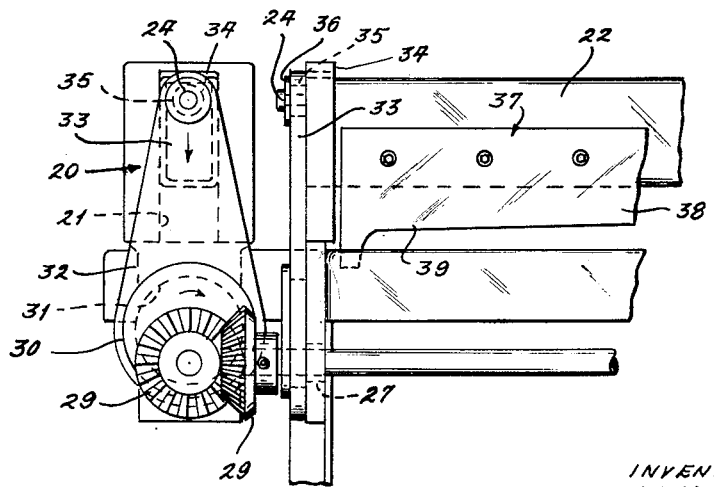
FIGURE 3 is an enlarged detail of the reciprocating mechanisms shown at the left sides of FIGURES 1 and 2.

Reciprocation of cutting blades in such perpendicular cutting planes may be effected by various conventional mechanisms. A suitable mechanism, simplified by eliminating conventional adjustment provisions and the like, includes two pairs of vertically slotted blade beam guides affixed to the edge flanges 14 or other table structure. One of such pairs of guides, designated 20, establishes the perpendicular cutting plane of the end cutter, shown at the left side of FIGURES 2 and 3. The other similar pair of guides, designated 20', fixes the cutting plane of the side edge cutter (at the aft side of the table) shown in elevation in FIGURE 2. Various conventional mechanical means, fixed or adjustable, may be used to establish such cutting planes. In the simple embodiment illustrated, each of the beam guides 20, 20' includes a vertically elongated slot 21, whose parallel slot walls guide one of the ends of a hollow horizontal reciprocating beam 22 which carries a cutting blade 37. That beam 22 which is located at the end of the surface 11 and mounted in the pair of guides 20, with associated parts hereafter described, is referred to as the end cutter; whereas the beam 22 guided by the guides 20' along the longer side of the surface 11, with its associated parts, is referred to as the longer side cutter.

Mounted in each end of each of the beams 22 is a thick end plate 23 into which is screwed a beam-driving pin or bolt 24 to which the reciprocating force is applied.

Mechanism located below the surface 11 includes an electric motor or other source of rotary power, not shown, supplied to a sheave 25 affixed to a horizontal power shaft 26 which extends in the cutting plane of the longer side cutter, well beneath the table surface 11, between bushings 27 in the lower portions of the beam guides 20, 20'. A similar horizontal shaft 26 is similarly supported in the end cutting plane in similar bushings 27, in the lower end of the guides 20. Intermediate support bushings 28 are also provided to support the shafts 26. Bevel gears 29 mounted on their adjacent ends serve as a power-transmitting connection between these power shafts.

Secured onto the shafts 26 between the gears 29 and the beam guides 20, 20' are drive eccentrics 30, each having an outer side flange 31 to provide a space outwardly of the beam guide 20. The eccentrics 30 function as drive cams within the lower cylindrical drive bores 32 of tapered, plate-like drive arms 33 (conventionally called "straps"). The arms or "straps" 33 extend taperingly upward to top bores 34 in which tubular bushings 35 are mounted. These serve as journal mountings for the beam pins or bolts 24. Washers 36 beneath the bolt heads complete the assembly of this beam reciprocating mechanism.

Mounted to the beam 22 is a cutting blade 37 having a downwardly presented edge 38, which does not extend horizontally along the full length of the blade but slopes gently from the horizontal in its mid-portion and sweepingly downward to keyed blade ends 39, referred to hereafter. The slope of the edge 38 provides a progressive cutting action as the blade descends.

The novel cutting (rather than "shearing") action of the apparatus is achieved as follows:

A pair of steel material-support members, generally designated as the inner support member 40 and the outer support member 41 are provided at the table surface 11 at each of the cutting planes before referred to. They are held by bolts 42 onto the table edge flange 14, spaced apart by spacing washers 43 (slightly thicker than the blade 37) between their adjacent vertical inner surfaces 44. A blade-accommodating slot is thus provided above the spacing washers 43, in which the downward projecting keyed blade ends 39 move, and into which the higher mid-portions of the blade edge 38 enter after they sever the insulating blanket. The upper surface portions 45 of the inner and outer support members 40, 41 lie in and define the same horizontal plane as the table surface 11, and support the blanket-like material as it is cut in the manner hereinafter described.

Joining the vertical surfaces 44 and the plane-defining surface portions 45 are 45° beveled surface portions 46 presented symmetrically inward toward vertical cutting planes. The beveled surface portions 46 intersect the horizontal plane-defining portions 45 in parallel edges 47 which define the width of what is in effect a notch in the horizontal support plane. The lower edges of the beveled surfaces 46 intersect the inner vertical surfaces 44 at vertical edge intersections 47 which are the parallel edges 47 and which define the opening of the blade-accommodating slot. The beveled surfaces 46 thus serve as inward-and-downward-sloping sides of such notch. The 45° bevel angle shown presents what appears to be an optimum slope angle for the sides of such notch, although other angles, ranging between approximately 30° and 60° from the horizontal may be utilized with a degree of success which is somewhat lessened as the extremes of the range are reached.

To supply blanket-like insulating material to the cutting table surface 11 a simple feed roll apparatus may be utilized, either as part of the same table or separately mounted adjacent to the end cutting plane, as shown. The apparatus consists of a pair of large vertical brackets or supports 50 having base flanges 51, between which a roll of material $a$ is supported upon a principal support roller shaft 52 at a level below the plane of the table surface 11. A weighted upper feed roll idler 53, mounted in slots 54 above the level of the surface 11, presses by gravity downward upon the insulating blanket material $b$ as it is fed onto the table surface 11 by a powered feed roll 55 mounted between the supports 50 on a horizontal axis of rotation, directly beneath the idler 53 and below the table surface 11. Power is supplied to the feed roll 55 by an electric feed motor 56, controlled by the operator of the machine through a conventional switch, numbered 57, which advances the blanket material $b$ under the raised end cutter a length measured along the linear gauge 12, into the position indicated in FIGURE 1 as 1st position. After cutting to length, the cut piece is manually moved across the table surface 11 under the side edge cutter, into 2d position, the width to be cut being measured along the fore-and-aft scales 13.

Cutting, both by the end cutter and the side edge cutter, is achieved without clamping in place, by steps which, taken together, are novel in their procedure and effect. The blanket-like material to be cut, such as glass fiber insulating material, consists of a backing $c$ which support a substantial thickness of fluffy resilient fibrous material $d$. When the material is drawn into position for cutting, the backing $c$ is generally in the horizontal plane defined by the upper surface portions 45 of the inner and outer support members 40, 41; and it bridges across the notch defined by the parallel edges 47. As the knife edge 38 of the blade 37 moves downward in a progressive cutting stroke, it presses the backing $c$ downward toward the center of this notch, in a somewhat concave curve, as shown in FIGURE 6. Bending the resilient fibrous material $d$ together results in compression, which tends to hold the backing $c$ pressed against the upper sloping surfaces 46 immediately beneath the parallel edges 47. By such compression the backing $c$ is held with considerable tautness, suspended in a concave curve in the notch below the plane of the table surface 11. This tautness makes it possible to cut with a single knife edge, rather than shearing. It is achieved without clamping the material or other manual or mechanical steps to establish tautness.

Specific features of the construction described are for the purpose of illustration rather than limitation. Changes in details of structure and procedure may be made without departing from the scope of this invention, which is to be measured as fully coextensive with the claims.

We claim:

1. Apparatus for cutting resilient blanket-like insulation material and the like, comprising
   a longitudinally-extending cutting blade having a downwardly presented edge,
   means to reciprocate the cutting blade in a vertical plane,
   material support members aligned on both sides of said vertical plane and separated from each other along said plane by a slot of greater width than the cutting blade and of a length which will accommodate the full longitudinal length thereof,
   said material support members having upper surface portions defining a horizontal plane,
   said upper surface portions having inner edges spaced outwardly from the vertical plane a distance greater than the width of the slot,
   said material support members further having sloping surfaces commencing at the inner edges of said plane-defining surface portions and extending inwardly and downwardly toward the slot,
   whereby to permit said blanket-like material to be pressed by the cutting blade into a concave curve below the plane and thereby to react such pressure to hold the material suspended taut as the edge of the blade severs it.

2. The apparatus as defined in claim 1, wherein said sloping surfaces of said material support members are inclined planar surfaces presented at a bevel angle to the upper surface portions thereof.

3. The apparatus as defined in claim 2, wherein the bevel angle is between 30° and 60°.

4. The apparatus as defined in claim 2, wherein the bevel angle is approximately 45°.

References Cited by the Examiner

UNITED STATES PATENTS

| | | | |
|---|---|---|---|
| 442,823 | 12/90 | Palm | 83—636 |
| 1,078,202 | 11/13 | Keagy | 83—282 X |
| 1,158,686 | 11/15 | Henning | 83—175 |
| 1,288,038 | 12/18 | Krook | 83—485 X |
| 2,145,207 | 1/39 | Becker | 83—176 X |
| 2,261,837 | 11/41 | Allen | 83—578 X |
| 2,375,518 | 5/45 | Bolle | 83—176 X |
| 2,393,384 | 1/46 | Kress | 83—649 X |

ANDREW R. JUHASZ, *Primary Examiner.*